United States Patent
Templin et al.

(10) Patent No.: US 7,197,139 B2
(45) Date of Patent: Mar. 27, 2007

(54) REPLACEABLE PERSONAL DIGITAL ASSISTANT CRADLE FOR A TELEPHONE

(75) Inventors: Robert Charles Templin, Ottawa (CA); Toby John Kemp, Ottawa (CA); John Mahan, Ottawa (CA); Anders Fahrendorff, Ottawa (CA)

(73) Assignee: Mitel Knowledge Corporation, Ottawa (CA)

( * ) Notice: Subject to any disclaimer, the term of this patent is extended or adjusted under 35 U.S.C. 154(b) by 273 days.

(21) Appl. No.: 10/428,608

(22) Filed: May 2, 2003

(65) Prior Publication Data

US 2004/0076290 A1   Apr. 22, 2004

(51) Int. Cl.
*H04M 1/00* (2006.01)

(52) U.S. Cl. .......................... 379/428.04; 379/428.01; 379/428.03; 379/435; 379/436; 379/447

(58) Field of Classification Search ........... 379/428.04, 379/428.03, 428.01, 435, 436, 447
See application file for complete search history.

(56) References Cited

U.S. PATENT DOCUMENTS

| | | | |
|---|---|---|---|
| 5,157,723 A | 10/1992 | McLean | |
| 5,606,594 A | 2/1997 | Register et al. | 455/556.2 |
| 5,625,673 A | 4/1997 | Grewe et al. | |
| 5,644,471 A * | 7/1997 | Schultz et al. | 361/686 |
| 5,675,524 A | 10/1997 | Bernard | |
| 6,104,807 A * | 8/2000 | Johnson et al. | 379/428.04 |
| 6,266,539 B1 | 7/2001 | Pardo | |
| 2002/0086703 A1 | 7/2002 | Dimenstein et al. | |
| 2002/0090919 A1 * | 7/2002 | Hofman | |

FOREIGN PATENT DOCUMENTS

| | | |
|---|---|---|
| GB | 2 328 344 A | 2/1999 |
| GB | 2 346 761 A | 8/2000 |
| WO | WO 99/65209 | 12/1999 |
| WO | WO 02/35806 A2 | 5/2002 |

OTHER PUBLICATIONS

European Search Report—EP 03 25 2407—Aug. 27, 2003.

* cited by examiner

*Primary Examiner*—Quynh H. Nguyen
(74) *Attorney, Agent, or Firm*—Fay, Sharpe, Fagan, Minnich & McKee, LLP

(57) ABSTRACT

A telephone set includes a cradle for receiving a selected electronic device, such as a Personal Digital Assistant (PDA). The cradle comprises a cradle base and a cradle cover coupled to the cradle base. The cradle cover includes a support for selectively securing the selected electronic device thereto. Means for coupling the cradle to the telephone set, which preferably comprises a snap device, is provided. A connector is coupled to the cradle in order to enable communication between the selected electronic device and the telephone set. The cradle can be selectively removed from the telephone set by decoupling the cradle base from the telephone set.

11 Claims, 5 Drawing Sheets

REPLACEABLE PERSONAL DIGITAL ASSISTANT CRADLE FOR A TELEPHONE

FIELD OF THE INVENTION

The present invention relates to a personal digital assistant (PDA) cradle for a telephone set, and in particular it relates to a cradle that is replaceable.

BACKGROUND OF THE INVENTION

Personal digital assistants have become very popular in recent years because of their lightweight construction and compact design. PDAs provide a compact substitute for bulky address books and daily planners, for example, offering a fully functioning computer that can be stored in a user's pocket.

PDAs are operable as stand alone devices, however, workstation cradles are provided for data synchronization between the PDA and a personal computer. Thus, a user's address books and schedulers in both the PDA and personal computer can be synchronized with each other when there is a change made to either device. The cradle typically includes a plastic molded housing for receiving the PDA. The housing contains an integrated power supply and a serial connection to the workstation. When the PDA is "docked" in the cradle, the palm-top PDA battery may be charged and the applications running on both the PDA and the workstation may be synchronized over a bidirectional serial link.

In most large organizations, several computer workstations are typically linked to a common network. The network may be internal only or it may include a link to the Internet. A user may wish to access the Internet directly through a PDA or, alternatively, a user may wish for data synchronization to be performed between the PDA and the network without linking to a workstation.

A PDA receiving cradle that is integrated into a telephone set is disclosed in United Kingdom Patent Application No. GB2346761. The PDA is dockable within the telephone set for controlling communication functions of the telephone including dialing a number and displaying information regarding incoming calls, for example.

PDA cradles are not currently standardized, therefore, the telephone set of GB2346761 having a PDA receiving cradle built-in is limited because it is only compatible with a particular type of PDA.

It is an object of the present invention to provide a removable cradle for a telephone set that obviates or mitigates the above disadvantages.

SUMMARY OF THE INVENTION

According to one aspect of the present invention there is provided a telephone set having a cradle, the cradle comprising:

a cradle base, a cradle cover coupled to the cradle base, the cradle cover including a support for selectively securing a selected electronic device to the cradle cover;

a connector coupled to the cradle, the connector for enabling communication between the selected electronic device and the telephone set;

means for coupling the cradle to the telephone set; and wherein the cradle can be selectively removed from the telephone set by decoupling the cradle base from the telephone set.

The present invention provides advantages in that many different PDA cradles can be coupled to a common telephone set.

BRIEF DESCRIPTION OF THE DRAWINGS

An embodiment of the present invention will now be described more fully with reference to the accompanying drawings in which.

DETAILED DESCRIPTION OF THE PREFERRED EMBODIMENT

Figure 1:
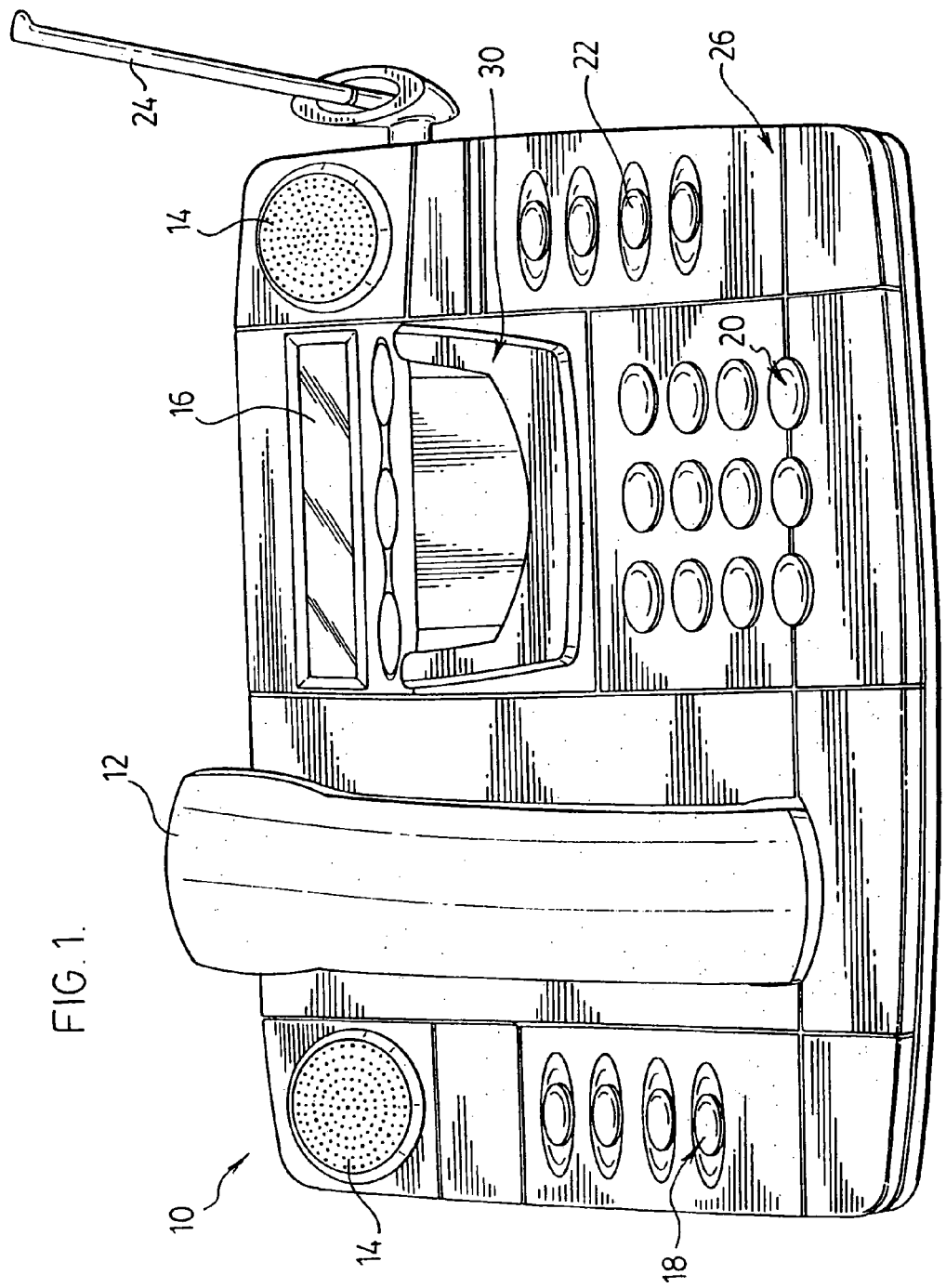
FIG. 1 is a front perspective view of a telephone set including a removable cradle of the present invention.

Referring now to FIG. 1, a telephone set 10 is generally shown. The telephone set 10 includes a handset 12 that rests on a telephone housing 26, which is comprised of molded plastic. The telephone set 10 further includes speakers 14, a display 16 and an antenna 24. Function keys 18, 20 and 22 are provided for operating the telephone set 10.

Figure 2:
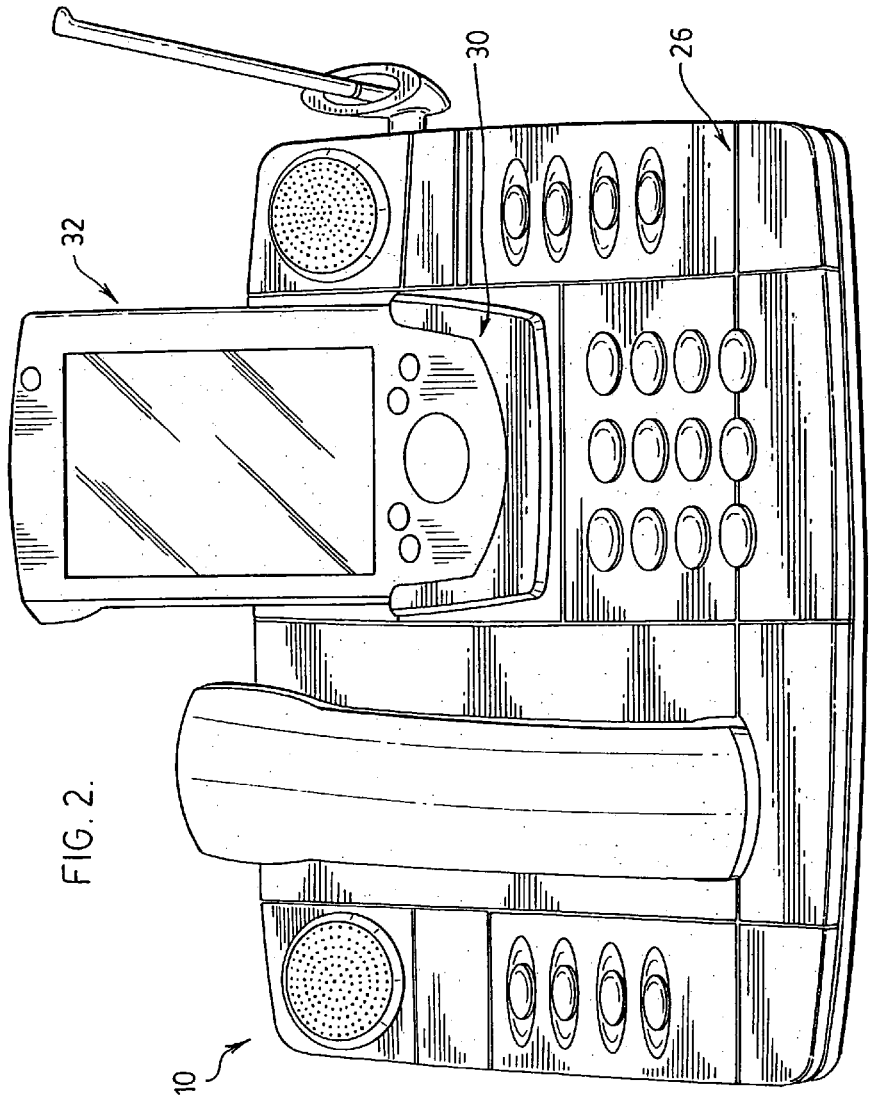
FIG. 2 is front perspective view of a PDA mounted in the telephone set of FIG. 1.

A cradle 30 is mounted in the telephone housing 26. The cradle 30 is sized to receive an electronic device such as a Personal Digital Assistant (PDA) 32, as shown in FIG. 2.

Figure 3:
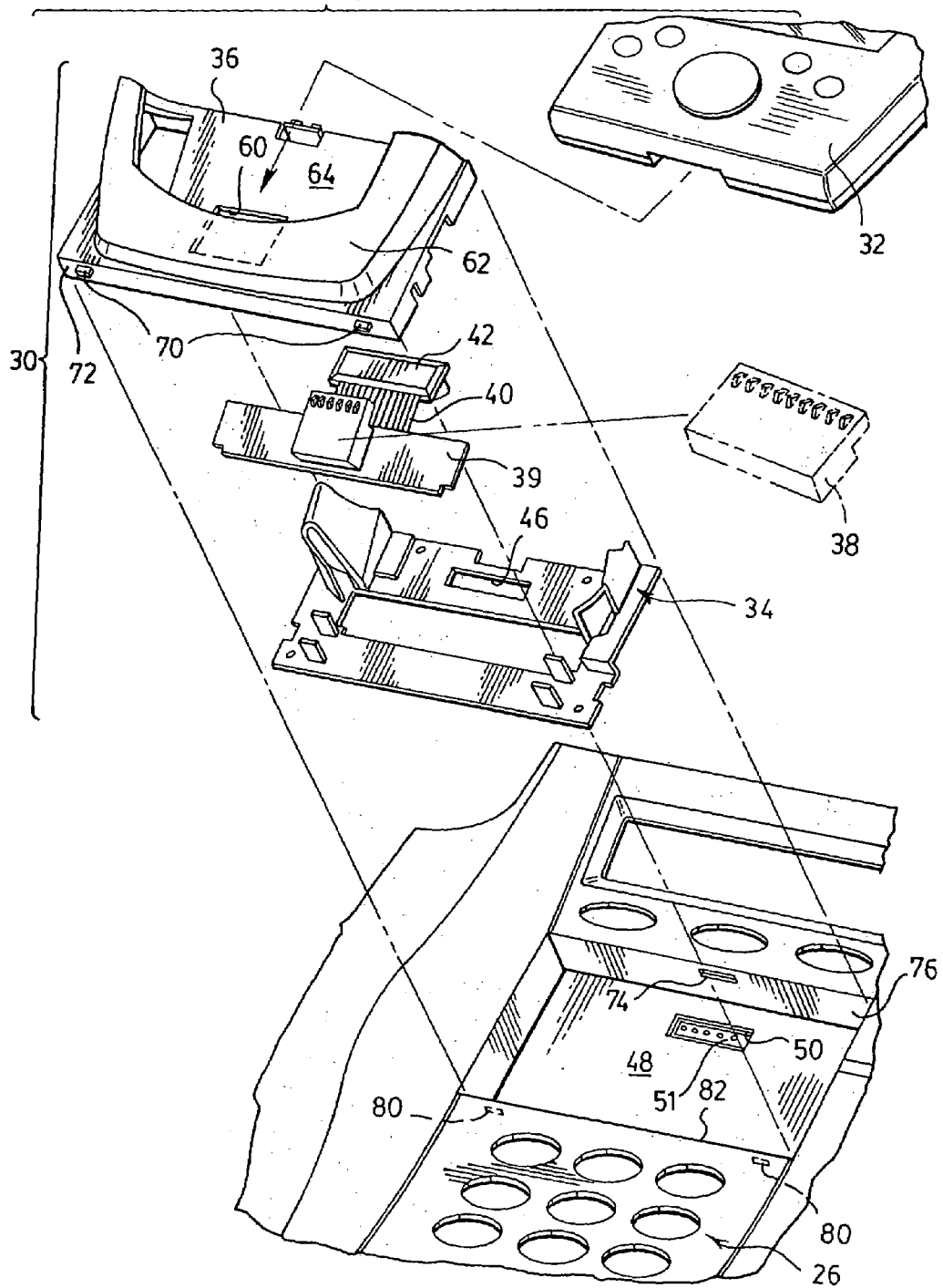
FIG. 3 is an exploded perspective view of portions of FIG. 1 viewed from above.
Figure 4:
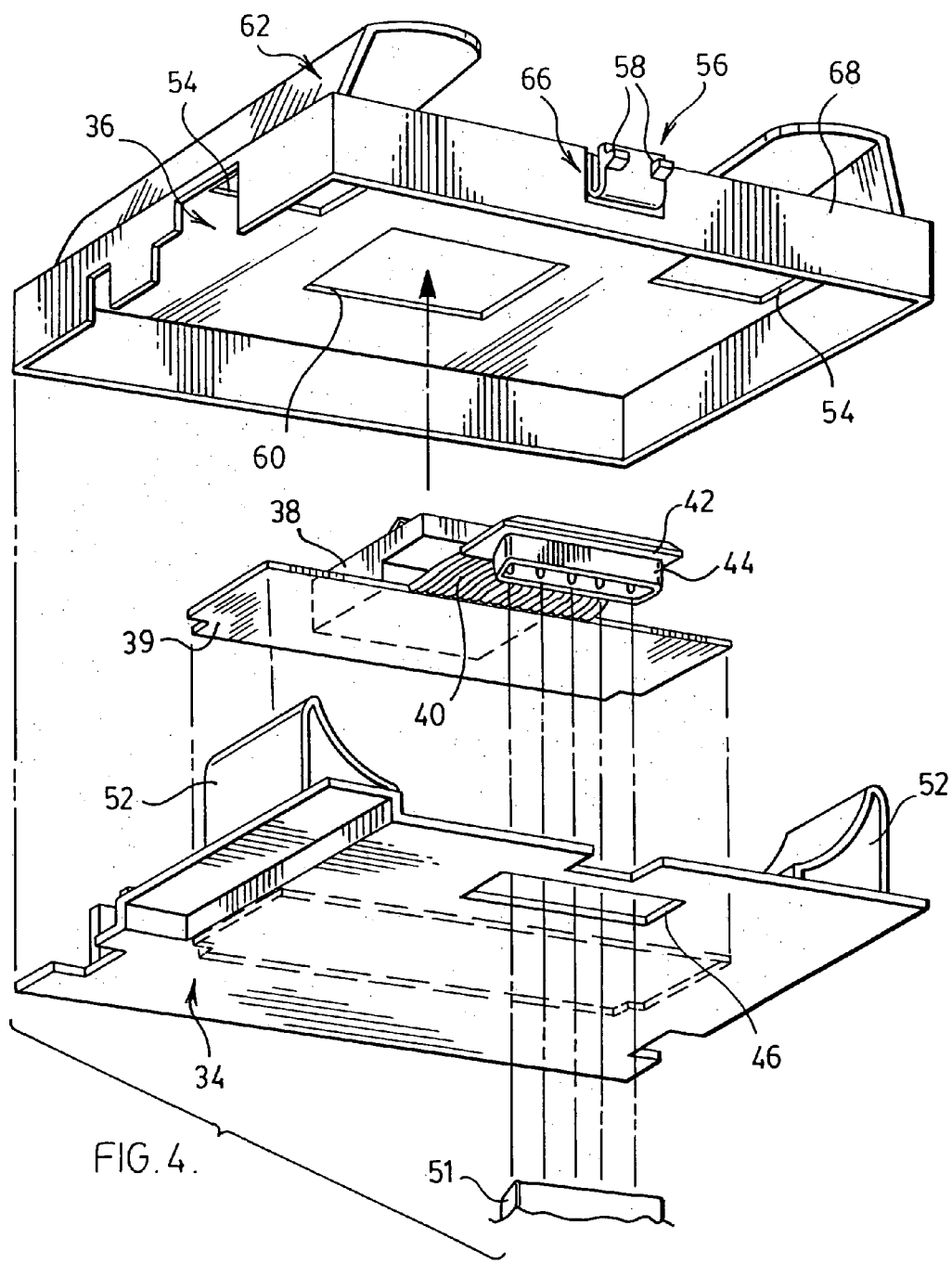
FIG. 4 is an exploded perspective view of portions of FIG. 3 viewed from below.

Referring to FIG. 3, a recess 48, which is sized to receive the cradle 30, is provided in the telephone housing 26. As shown, the cradle 30 comprises a cradle base 34 and a cradle cover 36, which are preferably comprised of plastic. The cradle base 34 and the cradle cover 36 are coupled together to house a PDA connector 38. The PDA connector 38 is mounted on backing 39, which is coupled to the cradle base 34 in order to secure the PDA connector 38 to the cradle base 34. A flex cable 40 extends between the PDA connector 38 and a Printable Circuit Board (PCB) 42, which includes a cradle-to-telephone connector 44. The cradle-to-telephone connector 44 is shown in FIG. 4.

An aperture 46 is provided in the cradle base 34. The aperture is sized to allow the cradle-to-telephone connector 44 to extend therethrough. A corresponding aperture 50 is located on a lower surface 52 of the recess 48. When the cradle 30 is mounted in the recess 48 of the telephone set 10, the cradle-to-telephone connector 44 extends through the corresponding aperture 50 to mate with a connector 51 of a circuit board (not shown) of the telephone set 10.

A support flange 62 extends around a lower portion of the cradle cover 36 to form a pocket for receiving the PDA 32. The support flange 62 is shown as continuous, however, it may alternatively be formed in sections. The support flange 62 is offset from a back wall 64 of the cradle cover 36 and firmly secures the PDA to the telephone set 10. A central aperture 60 is provided in the back wall 64 of the cradle cover 36, which allows the PDA connector 38 to extend into cradle cover 36 so to communicate with a port 86 (shown in FIG. 6) the PDA.

The cradle base 34 includes a pair of arms 52 that mate with a pair of apertures 54, which are provided in the cradle cover 36. The cradle base 34 and the cradle cover 36 are typically only de-coupled from one another when repairs are to be performed on the cradle 30.

The cradle 30 is coupled to the telephone set 10 by a snap device 56, which is mounted on an upper wall 68 of the cradle cover 36, and a first pair of projections 70, which extend from an opposing lower wall 72 of the cradle cover 36. The snap device 56 includes a second pair of projections 58 that extend outwardly from a flexible portion 66 thereof. The second pair of projections 58 mates with a slot 74 that is provided on a sidewall 76 of the recess 48. The flexible portion 66 of the snap device 56 is compressible so that the projections 58 can be moved into and out of engagement with the slot 74. The projections 78 mate with corresponding slots 80, which are formed in an opposing sidewall 82 of the recess 48. As can be seen, the cradle base 34 does not actually connect to the telephone set 10 but serves to locate the cradle 30 in the recess 48 of the telephone set 10.

It will be appreciated by a person skilled in the art that the snap device 56 could be replaced with another coupling means, for example, screws or another type of fastener.

Figure 5:
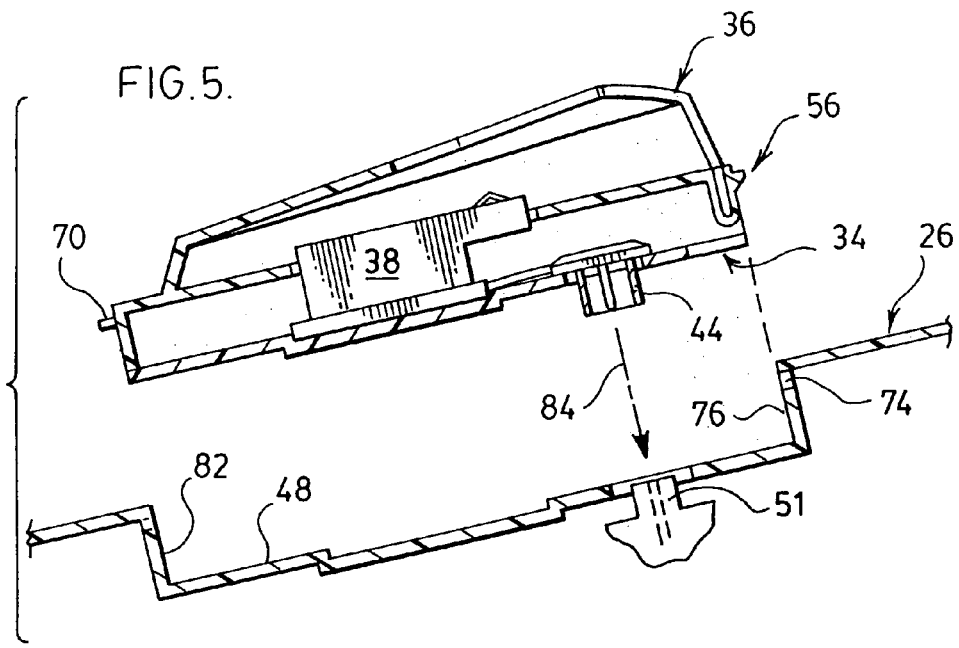
FIG. 5 is a side sectional view of portions of FIG. 1 with the removable cradle de-coupled from the telephone set.
Figure 6:
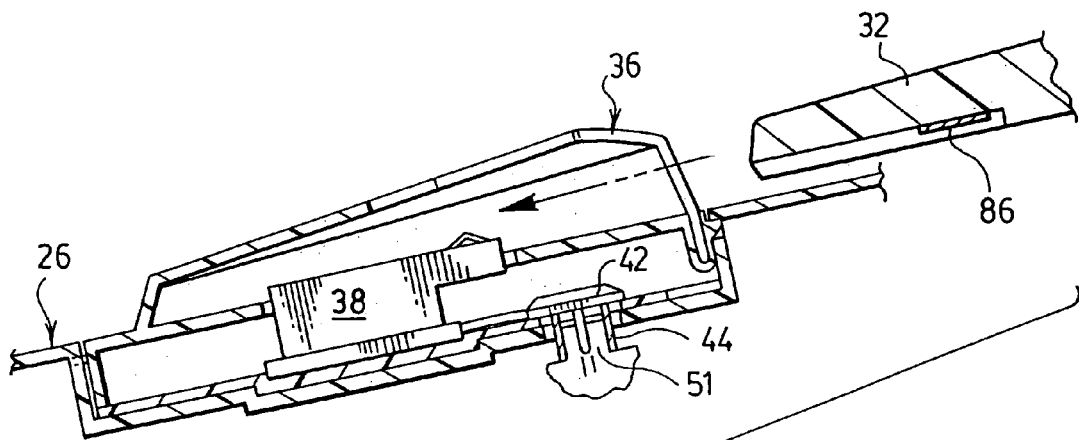
FIG. 6 is a side sectional view of portions of FIG. 1 with the removable cradle coupled to the telephone set.

Referring to FIGS. 5 and 6 installation of the cradle is shown. The cradle 30 is moved in the direction of arrow 84 to mate with the recess 48 of the telephone set 10. The cradle 30 is installed in a manner which allows the second pair of projections 70 to mate with slots 74 while the flexible portion 66 of the snap device 56 compresses thus allowing the first pair of projections 70 to mate with the slot 74. Therefore, the user locks the cradle 30 in place. Once the cradle 30 is installed, the user slides the PDA 32 into the cradle cover 36 where it is secured in place by support flange 62. The port 86 of the PDA contacts the PDA connector 38 to allow for the exchange of data between the circuit board of the telephone set 10 and the PDA 32. Thus, the PDA 32 is linked to the network through the telephone set 10.

Cradles can be provided for any PDA configuration so that the same telephone set 10 may be used with many different PDAs.

In an embodiment of the present invention, the PDA 32 is used in conjunction with the telephone set 10 to provide touch screen dialing and messaging to the telephone set 10. The location of the PDA cradle 30 on the telephone set 10 makes this type of application particularly convenient.

Although a preferred embodiment of the present invention has been described, those of skill in the art will appreciate that variations and modifications may be made. For example, the PCB 42 and flex cable 40 may be replaced by other types of flex circuitry. The cradle 30 may be configured to allow other electronic devices such as data acquisition devices, cameras and portable telephones to be mounted in the cradle 30. All such embodiments and modifications are believed to be within the sphere and scope of the invention as defined by the appended claims.

We claim:

1. A telephone set having a cradle, said cradle comprising:
    a cradle base;
    a cradle cover coupled to said cradle base, and cradle cover including a support for selectively securing a selected electronic device to said cradle cover;
    a connector coupled to said cradle, said connector for enabling communication between said selected electronic device and said telephone set;
    a recess for locating said cradle in a housing of said telephone set; and
    means for coupling said cradle to said telephone set housing, comprising a snap device projecting from a sidewall of said cradle cover, said snap device for mating with a slot provided in a corresponding sidewall of said recess,
    said cradle for connecting intermediate said telephone set housing and said electronic device, wherein said cradle can be selectively removed from said telephone set housing by decoupling said cradle base from said telephone set housing.

2. A telephone set as claimed in claim 1, wherein said snap device comprises a flexible portion having at least one projection that extends outwardly from said flexible portion to engage said slot.

3. A telephone set as claimed in claim 2, wherein further means for coupling said cradle to said recess is provided, said further means for coupling comprises at least one projection extending from an opposing sidewall of said cradle cover, said at least one projection for mating with a slot provided in a second corresponding sidewall of said recess, said second corresponding sidewall being opposed to said corresponding sidewall of said cradle cover.

4. A telephone set as claimed in claim 1, wherein said selected electronic device is a personal digital assistant.

5. A telephone set as claimed in claim 1, wherein said selected electronic device is selected from the group comprising: data acquisition devices, cameras and portable telephones.

6. An interchangeable cradle for securing an electronic device to a telephone set, comprising:
    a cradle body for receiving said electronic device, said cradle body being sized for mounting in a recess provided in a housing of said telephone set;
    a first connector dimensioned to electrically mate with a counterpart connector on said electronic device;
    a second connector dimensioned to electrically mate with a further connector on said telephone set; and
    means for releasably coupling said cradle body to said telephone set, comprising a snap device projecting from a sidewall of said cradle body, said snap device for mating with a slot provided in a corresponding sidewall of said recess such that said cradle connects intermediate said electronic device and said telephone set.

7. An interchangeable cradle as claimed in claim 6, wherein said snap device comprises a flexible portion having at least one projection that extends outwardly from said flexible portion to engage said slot.

8. An interchangeable cradle as claimed in claim 7, wherein further means for coupling said cradle body to said recess is provided, said further means for coupling comprises at least one projection extending from an opposing sidewall of said cradle body cover, said at least one projection for mating with a slot provided in a second corresponding sidewall of said recess, said second corresponding sidewall being opposed to said corresponding sidewall of said cradle cover.

9. An interchangeable cradle as claimed in claim 6, wherein said electronic device is a personal digital assistant.

10. An interchangeable cradle as claimed in claim 6, wherein said electronic device is selected from the group comprising: data acquisition devices, cameras and portable telephones.

11. An interchangeable cradle as claimed in claim 6, wherein said cradle body further comprises a base, a cover coupled to said base and a pocket for supporting said electronic device in said cradle, wherein said first and second connectors are enclosed within said cover and said base.

* * * * *

UNITED STATES PATENT AND TRADEMARK OFFICE
CERTIFICATE OF CORRECTION

| | |
|---|---|
| PATENT NO. | : 7,197,139 B2 |
| APPLICATION NO. | : 10/428608 |
| DATED | : March 27, 2007 |
| INVENTOR(S) | : Robert Charles Templin et al. |

It is certified that error appears in the above-identified patent and that said Letters Patent is hereby corrected as shown below:

Title Page, line (73), Assignee: should read -- Mitel Networks Corporation --.

Signed and Sealed this

First Day of July, 2008

JON W. DUDAS
*Director of the United States Patent and Trademark Office*